US006783344B1

United States Patent
Rudolf

(10) Patent No.: US 6,783,344 B1
(45) Date of Patent: Aug. 31, 2004

(54) METHOD OF AND DEVICE FOR CONTROLLING AND AUTOMATICALLY CONTROLLING THE THICKNESS PROFILE IN THE PRODUCTION OF BLOWN FILM

(75) Inventor: Hans-Joachim Rudolf, Leverkusen (DE)

(73) Assignee: Kdesign GmbH (DE)

( * ) Notice: Subject to any disclaimer, the term of this patent is extended or adjusted under 35 U.S.C. 154(b) by 132 days.

(21) Appl. No.: 09/657,314

(22) Filed: Sep. 7, 2000

(30) Foreign Application Priority Data

Sep. 9, 1999   (DE) .......................................... 199 42 999
Jun. 19, 2000  (DE) .......................................... 100 29 175

(51) Int. Cl.$^7$ ............................................. B29C 47/92
(52) U.S. Cl. ...................... 425/72.1; 425/141; 425/144; 425/387.1; 425/392
(58) Field of Search ................................ 264/40.3, 406, 264/40.1, 519, 569, 568; 425/141, 143, 144, 326.1, 72.1, 392, 387.1

(56) References Cited

U.S. PATENT DOCUMENTS

| | | | | |
|---|---|---|---|---|
| 3,835,209 A | * | 9/1974 | Karabedian ................... 264/51 |
| 4,019,843 A | * | 4/1977 | Zimmermann .............. 425/72.1 |
| 4,209,475 A | * | 6/1980 | Herrington et al. ......... 264/40.1 |
| 4,330,501 A | * | 5/1982 | Jones et al. .................. 264/566 |
| 4,443,400 A | * | 4/1984 | Herrington ................... 264/519 |
| 4,606,879 A | | 8/1986 | Cerisano ...................... 265/565 |
| 4,750,874 A | * | 6/1988 | Keim ......................... 425/72.1 |
| 4,826,414 A | * | 5/1989 | Planeta ....................... 425/72.1 |
| 4,834,924 A | * | 5/1989 | D'Annunzio et al. ....... 264/40.3 |
| 4,929,162 A | * | 5/1990 | Planeta ....................... 425/72.1 |
| 5,116,211 A | * | 5/1992 | Shinmoto .................... 425/141 |
| 5,281,375 A | * | 1/1994 | Konermann ................. 264/40.3 |
| 5,354,190 A | | 10/1994 | Hofer et al. |
| 5,468,134 A | * | 11/1995 | Cree .......................... 425/72.1 |
| 5,562,926 A | * | 10/1996 | Karl ........................... 425/72.1 |
| 5,576,029 A | * | 11/1996 | Planeta ....................... 425/72.1 |
| 5,580,582 A | * | 12/1996 | Achelpohl ................... 425/72.1 |
| 5,624,689 A | * | 4/1997 | Schmitz et al. ............. 425/72.1 |
| 5,676,893 A | | 10/1997 | Cree |
| 5,804,221 A | * | 9/1998 | Planeta et al. .............. 425/72.1 |

FOREIGN PATENT DOCUMENTS

| | | | |
|---|---|---|---|
| DE | 2658518 A1 | 6/1978 | |
| DE | 3628201 A1 | 4/1988 | |
| DE | 3920194 A1 | 1/1991 | |
| DE | 4001287 A1 | 7/1991 | |
| DE | 4109385 A1 * | 9/1992 | ........... B29C/47/88 |
| DE | 42 22 260 | 1/1993 | |
| DE | 4207439 A1 | 6/1993 | |
| DE | 4218995 A1 | 12/1993 | |
| DE | 4218997 C1 | 1/1994 | |
| DE | 4428212 A1 | 11/1995 | |
| DE | 19629076 A1 | 1/1998 | |
| EP | 0508167 A2 | 3/1992 | |
| JP | 05228993 A * | 9/1993 | ........... B29C/55/28 |
| WO | WO 95/15251 | 8/1995 | |

* cited by examiner

*Primary Examiner*—Mark Eashoo
(74) *Attorney, Agent, or Firm*—Harness, Dickey & Pierce, P.L.C.

(57) ABSTRACT

A device for controlling thickness of film in a blown film extruder has a blow head, a main cooling ring and an additional cooling ring. The additional cooling ring supplies separate additional air streams. A measuring and controlling device controls the thickness profile of a blown film. The measuring and controlling device scans the thickness of the blown film above a freezing zone. The device controls the additional air streams as a function of the measured blown film thicknesses. The additional cooling ring is a segmented ring arranged at the blow head of a blown film extruder adjacent the main cooling ring. A method utilizing device is likewise disclosed.

9 Claims, 10 Drawing Sheets

METHOD OF AND DEVICE FOR CONTROLLING AND AUTOMATICALLY CONTROLLING THE THICKNESS PROFILE IN THE PRODUCTION OF BLOWN FILM

CROSS-REFERENCE TO RELATED APPLICATION

This application is based upon and claims priority to German Patent Application 199 42 999.5 filed Sep. 9, 1999, and German Patent Application 100 29 175.9 filed Jun. 19, 2000, which applications are herein expressly incorporated by reference.

BACKGROUND OF THE INVENTION

The invention relates to a method of controlling and automatically controlling the thickness profile in the production of blown film. The invention also relates to a device for carrying out the method.

The thickness profile and especially the circumferential thickness profile of a film tube emerging from a forming tool or annular nozzle of a blown film extruder, in the circumferential position, has thicker and thinner regions. These regions are in largely fixed positions, which adversely affects the winding and further processing of the film tube.

During the production process, to reduce any deviations of the thickness profile as early as possible, hotter regions are stretched to a greater extent and cooler regions to a lesser extent. In prior art devices, the differences in the thickness of the blown film across the circumference are influenced by varying the cooling power across the circumference. The film tube is divided into individual associated circumferential sectors as a function of the number of control elements.

If the cooling power is higher in one circumferential sector, the blown film in that sector cools more quickly. Thus, that sector is stretched to a lesser extent and remains relatively thicker. If the cooling power is lower in one circumferential sector, the blown film retains a higher temperature and can be stretched to a greater extent. As a result, the film thickness is reduced to a greater extent. The differences in film thickness across the circumference are determined by a measuring device. This data is fed into a control device. As a rule, the measuring device is arranged in the direction of production behind a freezing region of the film material.

DE 40 01 287 C2 and EP 0 508 167 A2 disclose cooling air rings. The rings are divided into segments. The volume or the temperature of the cooling air is changed by devices built into the segments.

In DE 40 01 287 A1, to change the individual volume streams, partial streams of the cooling air are branched off and blown off. The partial streams do not participate in cooling the blown film. This is disadvantageous from an energy efficiency viewpoint. The large number of control units fitted directly to the cooling air ring leads to a very tight arrangement of parts.

In EP 0 508 167 A2, a cooling air ring has nozzles in two exit planes. A smaller partial stream is supplied, uncontrolled, to a first plane, relatively close to the annular nozzle of the blow head. A larger partial stream of cooling air is supplied in a second plane in the direction of production. The temperature of the larger partial stream is controlled segment by segment. The heating elements fitted directly in the cooling ring again lead to a tight arrangement inhibiting the flow conditions. The reaction of the heating elements suffers from inertia.

The main disadvantage of the above-mentioned systems is that the devices have to be fitted in the cooling ring. This constitutes interference with the sensitive aerodynamic system of the cooling air ring. Furthermore, because of the influence on the air quantity or temperature in the cooling ring, losses may occur in the overall cooling power.

DE 26 58 518 C2 discloses influencing differences in the film thickness by corrective air nozzles. The nozzles are arranged on the outside above the cooling ring (external air blowing ring). The disadvantage of this device is that the corrective nozzles are arranged above the cooling ring. In this case, thickness corrections can only take place to a limited extent because the film material has already been subjected to cooling air by the main cooling ring. Thus, the temperature of the film material has already been reduced.

It is the stretching process which allows the corrective air to exert its influence. The stretching process has partly already taken place above the main cooling ring. This reduces the influencing potential with respect to thickness corrections in this region. A further disadvantage of this device is that the corrective air nozzles are arranged above the main cooling ring. Thus, due to the space taken up by the corrective air nozzles, there is only very restricted access to the film bubble (when starting the plant), to the nozzle gap (deposits have to be removed regularly from melt exit), and to the main cooling ring (cooling air ring lips to be set as a function of the respective production process). This device has a further disadvantage. Depending on the required end dimension of the film tube, the position of the corrective air nozzles has to be adapted to the film tube diameter behind the main cooling ring.

DE 39 20 194 C2 discloses a method and device to control the thickness profile of a blown film in the course of production. The device uses an additional cooling ring divided into segments. The ring is arranged in the direction of production behind/above a main cooling ring. This means that in this device, the cooling air streams influence the film thickness first flowing downstream into the main cooling air stream. As a result, they only exert a slight influence on the thickness correction of the film tube which has already been cooled.

DE 196 29 076 A1 discloses a cooling ring to cool a film tube emerging from the annular gap of a film blow head. The cooling ring is supplied with cooling air at two different temperatures. Inside the head, the cooling air is variably mixed independently for each segment for thickness controlling purposes. This device requires more sophisticated equipment to generate cooling air with a certain temperature and to mix the cooling air. It also has to have a very compact and complicated design due to the large number of mixing valves closely arranged inside the cooling ring.

DE 44 28 212 A1 discloses a blow head to produce tubular film. Here, an additional cooling ring is arranged between the exit nozzle of the blow head and an uncontrolled main cooling ring. The additional cooling ring includes small pipes. The pipes start from an outer annular line, extend radially inwardly and each pipe contains a heating cartridge to heat the additional cooling air. The cooling air is uncontrolled in the volume stream. The reaction behavior of the heating cartridges is affected by inertia. Thus, the overall control behavior is expected to be bad. The design of the additional cooling ring with the large number of heating cartridges is extremely complicated. Additionally, the cartridges can be adversely affected by dirt. Further, to carry out maintenance work on the heating cartridges, the cooling rings have to be completely dismantled.

A further disadvantage of the above device is that, due to the required differences in temperature, the heating cartridges require a very effective thermal insulation. The cartridges must be insulated relative to each other and relative to the heated annular nozzle of the blow head.

When producing blown film, not only do differences occur in thickness in the circumferential direction, but they also occur in the direction of production. The fluctuations in the direction of production are uniformly superimposed on the differences in circumferential thickness. Thus, the circumferentially determined thickness is subject to periodic fluctuations in the direction of production. The fluctuations have different causes, such as output fluctuations of the extrusion unit or driving fluctuations of the extraction unit which pulls and stretches the tubular film in the longitudinal direction. To minimize the fluctuation causes, gravimetric throughput control systems are provided in the prior art. These systems connect the throughput of raw materials, the conveyor worm speed of the extrusion unit and the driving speed of the extraction unit in a control circuit in order to keep the mean film thickness constant.

A further cause of fluctuations that cannot be compensated for by prior art systems is frequently occurring low-frequency aerodynamic resonance oscillations in the cooling ring system between the blow-out lips of the cooling air nozzles and the tubular film. The film is held by the venturi effect. Also, in the region of the cooling air nozzles, the film still exhibits a highly resilient behavior. The resonance oscillation adversely affects the constancy of longitudinal stretching. Accordingly, this influences the film thickness in the direction of production in the form of a regular vibration. The frequency of the oscillation is within a range smaller than 1 Hz.

SUMMARY OF THE INVENTION

It is an object of the present invention to provide a method and device to carry out the method where the above disadvantages of prior art methods and devices are overcome through controllability and a simple design.

The objective is achieved by controlling the thickness profile in the production of blown film. A blown film extruder of the invention has a blow head, a main cooling ring to supply a main cooling gas stream and an additional cooling ring arranged outside the main cooling ring. The additional cooling ring supplies separate additional cooling gas streams. A measuring and controlling device measures the film thickness of the blown film above a freezing zone across the circumference. The additional cooling gas streams are controlled as a function of the measured film thicknesses. The additional cooling gas streams of the film tube are supplied at least from the outside in the direction of production in front of the main cooling gas streams. The streams are individually controlled as a function of the film thicknesses across the circumference with respect to their volume flow rate.

The objective is further achieved by a device to control the thickness profile in the production of blown film which has a blown film extruder with a blow head, a main cooling ring to supply a main cooling gas stream and an additional cooling ring arranged outside the main cooling ring. The additional cooling ring supplies separate additional cooling gas streams. A measuring and controlling device controls the thickness profile of the blown film. The device measures the film thickness across the circumference at the film tube above a freezing zone. The device controls the additional cooling gas streams as a function of the measured film thicknesses. The additional cooling ring is arranged above the blow head of the blown film extruder underneath the main cooling ring. At least one blower or any other air pressure source and a number of volume flow rate control elements and supply lines, which corresponds to the number of additional cooling gas streams, are provided outside the additional cooling ring.

The inventive method is advantageous because it supplies the additional cooling gas streams in the direction of production in front of the main cooling gas stream. Thus, it is possible to ensure that the tubular film is pre-cooled directly after emerging from the annular nozzle of the blow head. The pre-cooling is independent of the cooling effect of the main cooling gas stream. The volume control of the individual additional cooling gas streams is locally separated from the additional cooling ring. The device is uncomplicated, easy to handle and provides a good reaction behavior.

Due to the means for controlling the thickness profile and with the help of additional cooling gas streams, it is possible to provide the main cooling ring with simple adjusting means for optionally providing a plurality of annular gaps in different blow-out planes. This permits optimum adaptation to different process-technological conditions or requirements. It also increases the production output of the device due to a greater cooling effect.

Attaching the additional cooling ring underneath the main cooling ring enables the greatest possible influence on the cooling effect directly at the nozzle exit. The shape and size of the additional cooling ring is independent of the film tube diameter set by the main cooling ring and the inner gas volume of the film bubble. Also, the shape and size of the ring does not restrict access to the film tube, the nozzle gap of the blow head or the main cooling ring. The device to separately control the additional cooling gas streams is positioned outside the additional cooling ring. This is greatly advantageous since the volume flow rate control elements are positioned outside the hot zone of the annular nozzle of the blow head.

Pressurized air is used for the main cooling gas stream to provide cost effectiveness. It is advantageous to use inert gas or air with an inert gas admixture in the additional cooling gas streams. In this way it is possible to avoid oxidation symptoms of the hot film material at the annular nozzle of the blow head. Thus, the development of oxidation products at the annular nozzle can be prevented. In a preferred embodiment, the percentage of additional cooling gas streams is limited to no more than 5% of the entire cooling gas streams.

An improvement in thickness fluctuations in the direction of production can be achieved by, in addition to measuring the thickness distribution in the circumferential direction, taking measurements of the thickness distribution in the direction of production in one or several places on the circumference. Prior to being separated into volume-controllable additional cooling gas streams, a cooling gas stream is generated by an additional blower. The gas stream periodically changes with respect to its total volume flow rate as a function of the measured thickness in the direction of production. Thus, in the direction of production, compensation occurs for otherwise periodically occurring thickness fluctuations.

The volume-controllable additional cooling gas streams obtained by separating a cooling gas stream continuously generated by an additional blower are periodically jointly additionally changed as a function of the measured thickness distribution in the direction of production. Thus, in the direction of production of the blown film, compensation occurs for otherwise periodically occurring thickness fluctuations.

The amplitude and frequency of the uncorrected longitudinal thicknesses are determined by the measurements taken from the film thickness in the direction of production. The fluctuations largely compensate for by counter control of the additional cooling gas streams. Compensation can take place in two ways. One possibility is to control the control elements to generate an oscillation in the process where a corresponding periodic volume flow rate of the separate additional cooling gas streams is obtained. The control of the control elements with respect to frequency and amplitude is set to compensate for the previously determined periodic change in the film thickness in the direction of production. In a second possibility, the cooling gas stream generated by the blower is periodically influenced prior to being separated into individual volume-controllable additional cooling gas streams. The influence can be exerted by a suitable control element in the complete additional cooling gas stream by a flap and/or valve or by changing the speed of the blower.

The device in accordance with the invention is adapted to fit all prior art cooling ring systems. The device can even subsequently be added on. The overall cooling power of the adjoining main cooling ring is in no way adversely affected. Furthermore, there is no interference with the existing main cooling gas system.

According to an advantageous embodiment, the film thicknesses in the circumferential direction are measured intermittently, in terms of time, continuously across the circumference. A measuring head, movable on an annular carrier, scans, in a contact-free way, the thickness across the circumference at certain time intervals. This is possible because the thickness profile across the circumference is always constant with respect to position. The film thicknesses in the direction of production is preferably continuously measured between the individual measurements of the film thicknesses across the circumference in one circumferential position. It is possible to use the same measuring head held in one circumferential position.

It is particularly advantageous if the uncontrolled, circumferentially undivided main cooling gas stream exiting the main cooling ring is supplied in at least two blow-out planes. The cooling effect is clearly increased with a given cooling gas supply output. Depending on the required output rate of the tubular film, it may be sufficient for the circumferentially uniformly distributed main cooling gas and/or the additional cooling gas streams to be blown exclusively on the outside or on the inside against the film tube. Alternatively, it may become necessary for the circumferentially uniformly distributed main cooling gas and/or the additional cooling gas streams to be blown on the outside and on the inside against the film tube.

Further, it is possible to increase the control rate by using additional cooling gas streams on the outside and on the inside. If cooling gas is applied on the outside and on the inside against the film tube, it is advantageous for the blow-out planes of both the main cooling gas stream and of the additional cooling gas streams both on the outside and on the inside to be positioned on substantially corresponding planes.

According to a particularly advantageous embodiment any additional cooling gas streams in corresponding circumferential positions on the outside and on the inside of the tubular film are jointly supplied with pressure and are jointly volume-flow-controlled. The supply lines for additional cooling gas streams, in identical circumferential positions on the outside and on the inside of the film tube, are designed as branch lines of lines with a joint volume flow rate control element. This measure ensures that the design of the pressure supply means and of the control device for the additional cooling gas is kept simple. Further, it allows greater variation with respect to the controllable cooling effect in the individual circumferential regions.

The additional cooling ring may include a one-piece, so-called segment disc of a substantially uniform thickness. The segment disc includes a planar end face provided with supply bores distributed on its outer circumference. Radial grooves open at one end, start from the circumference, and extend substantially as far as the inner circumference. The end face has the radial grooves sealingly resting against a planar counter face of a cover part. The cover part can, especially, be formed by the main cooling ring itself. The underside of the main ring forms the planar counter face against which the segment disc is bolted. The counter face, together with the grooves, forms radial cooling gas channels in the segment disc,. The channels, via individual muffs at the through-bores, are supplied with separately controlled additional cooling gas streams. Near the exit, the individual cooling gas channels can change into one another.

In accordance with the above-mentioned preferred type of cooling gas supply, the main cooling ring includes two annular nozzles. The nozzles are arranged in at least two different planes. The nozzles extend parallel to the wall of the film tube.

An inner additional cooling gas ring to supply separate additional cooling gas streams inside the film tube can be designed in a similar way. The inner ring is supplied in the same way as the first additional cooling ring on the outside. It is also possible to provide a further blower and a number of volume flow rate control elements and further supply lines. These correspond to the number of additional cooling gas streams. However, in a preferred embodiment, the outer and the inner additional cooling rings are connected to branch lines for the additional cooling gas streams in corresponding circumferential positions.

The further additional cooling ring may be a one-piece, so-called segment disc of uniform thickness. The disc has a planar end face and is provided with supply bores distributed on the inner circumference. Radial grooves, open at one end, start from the inner circumference and extend as far as the outer circumference. The end face has the radial grooves sealingly resting against a planar counter face of a cover part. The cover part with the counter face can be formed by an underside of an inner cooling device inside the film tube.

In accordance with the already mentioned type of cooling agent supply, the inner cooling device may have annular nozzles. The annular nozzles are positioned in one or several planes. The annular nozzles are positioned in the planes of the annular nozzles of the main cooling ring. The inner cooling device may also include a centrically arranged air extraction pipe which projects into the film tube. The inner cooling device may have a plurality of annular discs arranged one above the other. Apart from a cover disc, the annular discs may be of identical design.

From the following detailed description, taken in conjunction with the drawings and subjoined claims, other objects and advantages of the present invention will become apparent to those skilled in the art.

BRIEF DESCRIPTION OF THE DRAWINGS

Preferred embodiments of the inventive device are illustrated in the drawing and will be described below.

Detailed Description of the Preferred Embodiment

Figure 1:
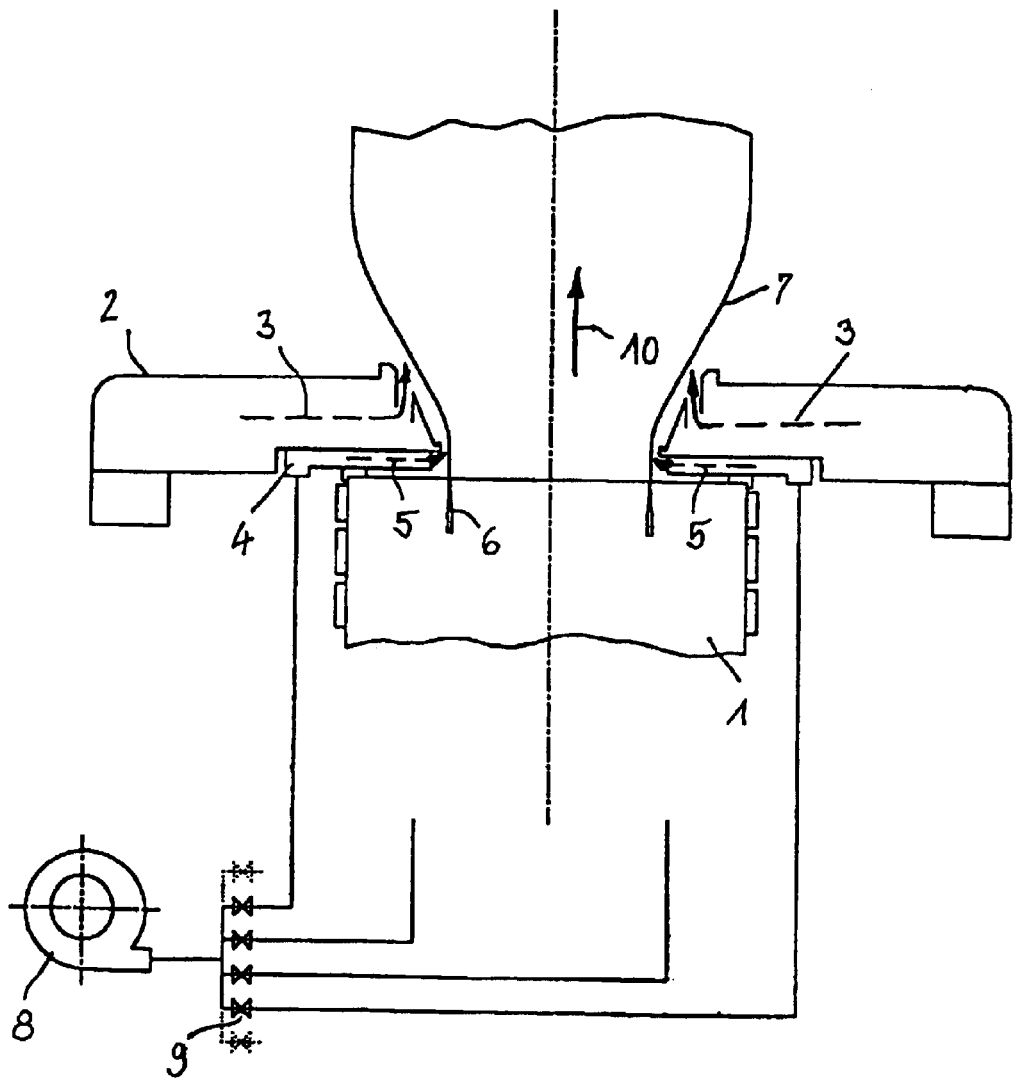
FIG. 1 is a schematic view of a blow head of a blown film extruder in accordance with the present invention.
Figure 2:
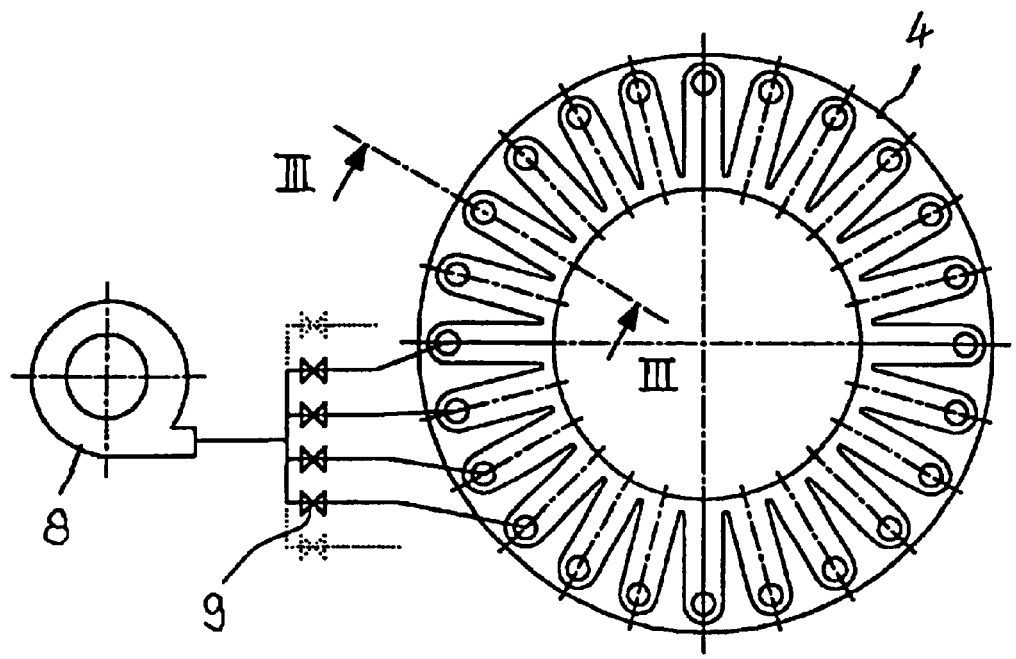
FIG. 2 is a plan view of the additional cooling ring with blower and control devices according to FIG. 1.
Figure 3:
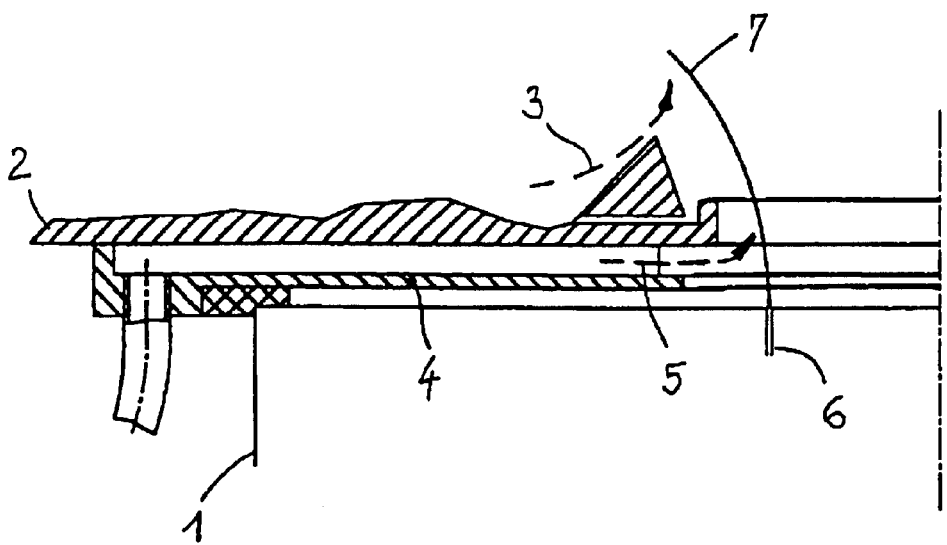
FIG. 3 is a partial section view of FIG. 2 along sectional line III—III thereof.

The device as illustrated in FIG. 1 includes a blown film extruder with a blow head 1, a main cooling ring 2 for a constant annular main cooling gas stream 3 and an additional cooling ring 4. The additional cooling ring is arranged underneath the main cooling ring 2. The additional cooling ring 4 supplies separate annularly arranged additional cooling gas streams 5 to cool a film tube 7 emerging from an annular channel 6 at the blow head 1. A measuring and controlling device controls the thickness profile of the film tube 7. The measuring and controlling device scans the film thickness at the film tube 7 above a freezing zone. The measuring and controlling device controls the additional cooling gas streams 5 as a function of the measured film thicknesses.

The additional cooling ring 4 is a segment disc arranged at the blow head 1 of the blown film extruder underneath the main cooling ring 2. The additional cooling ring 4 exerts the greatest possible influence on reducing the film thickness tolerances at this position. The additional cooling ring 4 is mounted directly at the exit where the plastic film material emerges from the annular channel 6 of the blow head 1. The additional cooling ring 4 is attached as an independent element to the main cooling ring 2. The additional cooling ring 4 is connected to a blower 8.

The blower 8 provides the additional cooling gas streams 5. A piece of equipment 9 is provided to divide the cooling gas stream generated by the blower 8 into individual separate additional cooling gas streams 5. The equipment 9 includes a plurality of flaps and/or valves. The equipment 9 is arranged outside, and separately from, the main cooling ring 2. This piece of equipment 9 permits very accurate control of the thickness profile during the production of the blown film.

The additional cooling gas streams 5 are supplied in the direction of production 10 of the film tube 7 in front of the main cooling ring 2. The additional cooling gas streams 5 are directed directly against the film tube 7 emerging from the blow head 1. Before entering the additional cooling ring 4, the additional cooling gas streams are controlled by the piece of equipment 9 with respect to their volume flow rate.

To improve the thickness tolerances of the blown film in the direction of production, equipment 9 periodically changes the cooling gas stream generated by the blower 8 prior to separation into individual volume-controllable additional cooling gas streams 5, with respect to its total volume flow rate, as a function of the measured longitudinal thicknesses of the blown film in the direction of production. Thus, otherwise periodically occurring thickness fluctuations are largely compensated for in the direction of production of the blown film.

However, in an embodiment which is modified as compared to the one described above, after a cooling gas stream continuously generated by the blower 8 has been separated into individual volume-controllable additional cooling gas streams, the individual volume flow rates of the additional cooling gas streams are periodically changed as a function of the measured longitudinal thicknesses of the blown film in the direction of production. Thus, any otherwise occurring thickness fluctuations are largely compensated for in the direction of production in the blown film.

Figure 4:
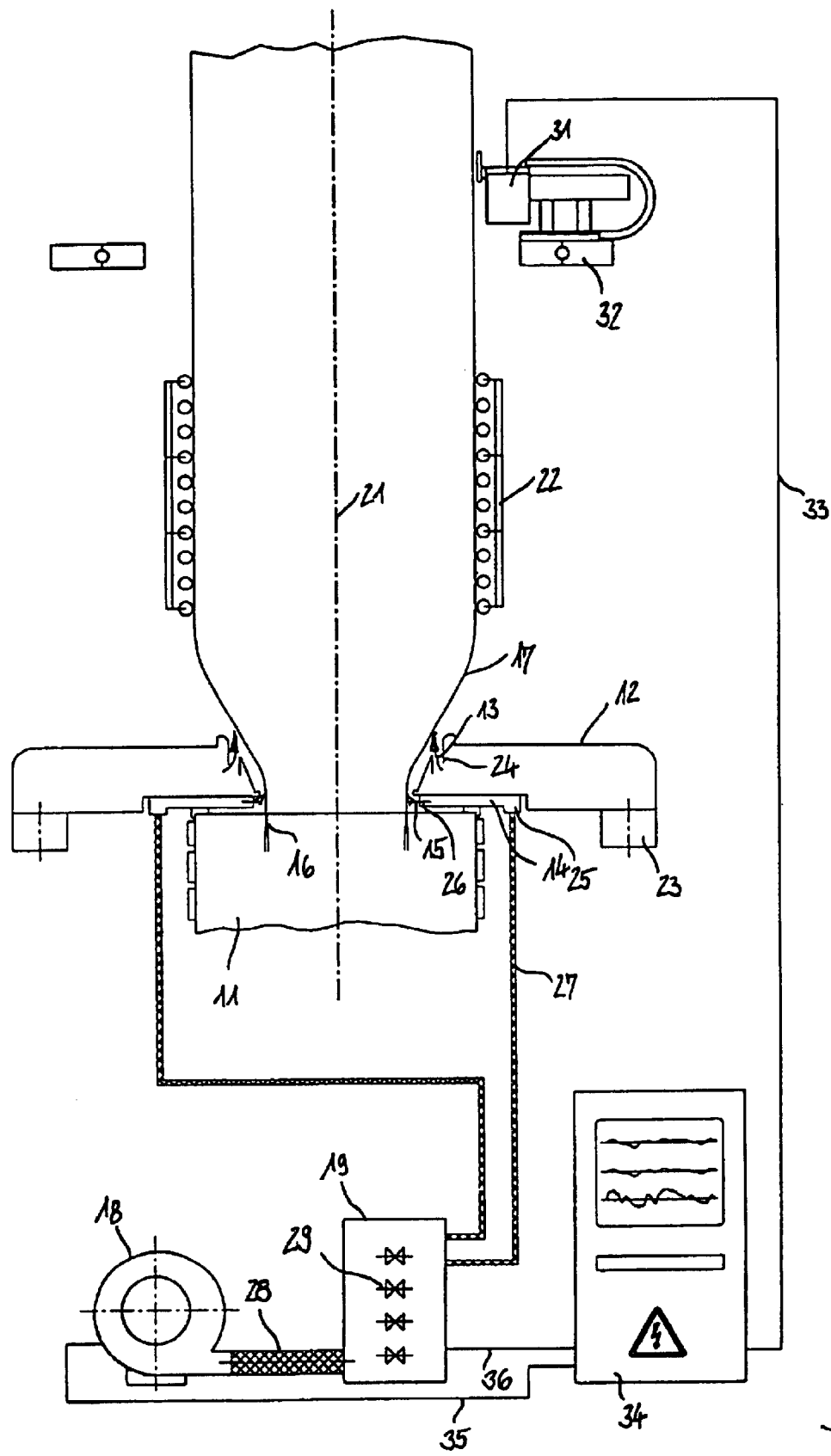
FIG. 4 is a second schematic view of a blown film extruder in accordance with the present invention.

FIG. 4 shows an inventive device with more details. A blow head 11 includes an annular channel 16. The annular channel 16, by means of its vertical central axis 21, emerges from the top end of the blow head. A film tube emerges from the annular channel 16. The film tube 17 is extracted upwardly by means not illustrated in greater detail. The film tube 17, through the application of internal pressure, is expanded after having left the annular channel 16. The film tube 17 is supported by a calibrating head 22 positioned above the blow head and largely defined with respect to its end diameter. The film tube 17 is annularly enclosed by a main cooling ring 12.

A substantially annular main cooling gas stream 13 escapes from the cooling ring 12. An additional cooling ring 14 is positioned directly between the blow head 11 and the main cooling ring 12. Individual additional cooling gas streams 15 escape from cooling ring 14. The cooling gas streams 13, 15 have a stabilizing effect on the expanding film tube 17. The cooling gas streams 13, 15 cool the plastic film material emerging from the annular nozzle 16 until, in a continuous freezing zone, the plastic expansion of the tube material is terminated as a result of the cooling effect. The main cooling ring 12 includes a torus-shaped hollow member which comprises a number of circumferentially distributed supply muffs 23. The cooling ring 12 has at least one annular nozzle 24 where the main cooling gas stream 13 exits the ring 12 as uniformly as possible.

The additional cooling ring 14 is a one-piece annular segment member.

The cooling ring 14 includes a plurality of supply muffs 25. The cooling ring 14, on its inner face close to the film tube 17, includes individual exit nozzles 26. Individual controllable additional cooling gas streams emerge from nozzles 26. Whereas the supply line leading to the muffs 23 of the main cooling ring 12 is not illustrated, there are shown, by way of example, two individual lines 27 leading to the supply muffs 25. The lines are connected to a device 19 including a number of control valves 29. The control valves 29 correspond to the actual number of the circumferentially distributed lines 27. Four lines 27 are shown by way of example. All of the lines 27 are air-pressure-loaded by a blower 18 through a supply line 28.

A contact-free thickness measuring unit 31 is positioned above the calibrating head 22. The measuring unit 31 is secured on a rotary rim 32. The rim 32 is arranged co-axially relative to the tube. The measuring unit 31, by periodically moving around the film tube 17, is able to measure the thickness distribution. Also, the measuring unit 31 can be held in one place and measure the longitudinal thicknesses of the film tube along a cylindrical line between the individual measurements of the circumferential thickness distribution. The longitudinal thicknesses is representative of the change in longitudinal thickness across the entire tube circumference.

As symbolized by a signal line 33, the results of the thickness measurements are processed in a measuring and control device 34.

A control line 35 extends to the blower 18. A control line 36 extends to the piece of equipment 19. The control line 35 is used to vary the overall blower output 18. The control line 36, which is representative of a plurality of control lines leading to the individual control valves 29, is used to individually change the opening cross-section of the usually pulse-width-modulated control valves 29. The measurements of the circumferential thickness distribution is converted into controlling the individual additional air streams 15. The measurements of the longitudinal thicknesses serve to determine the period of change in longitudinal thickness and, by anticipating counter-control, either the output of the blower 18 is changed or the control valves 29 are subjected to a corresponding periodic correction which is superimposed on the actual control process.

Figure 5:
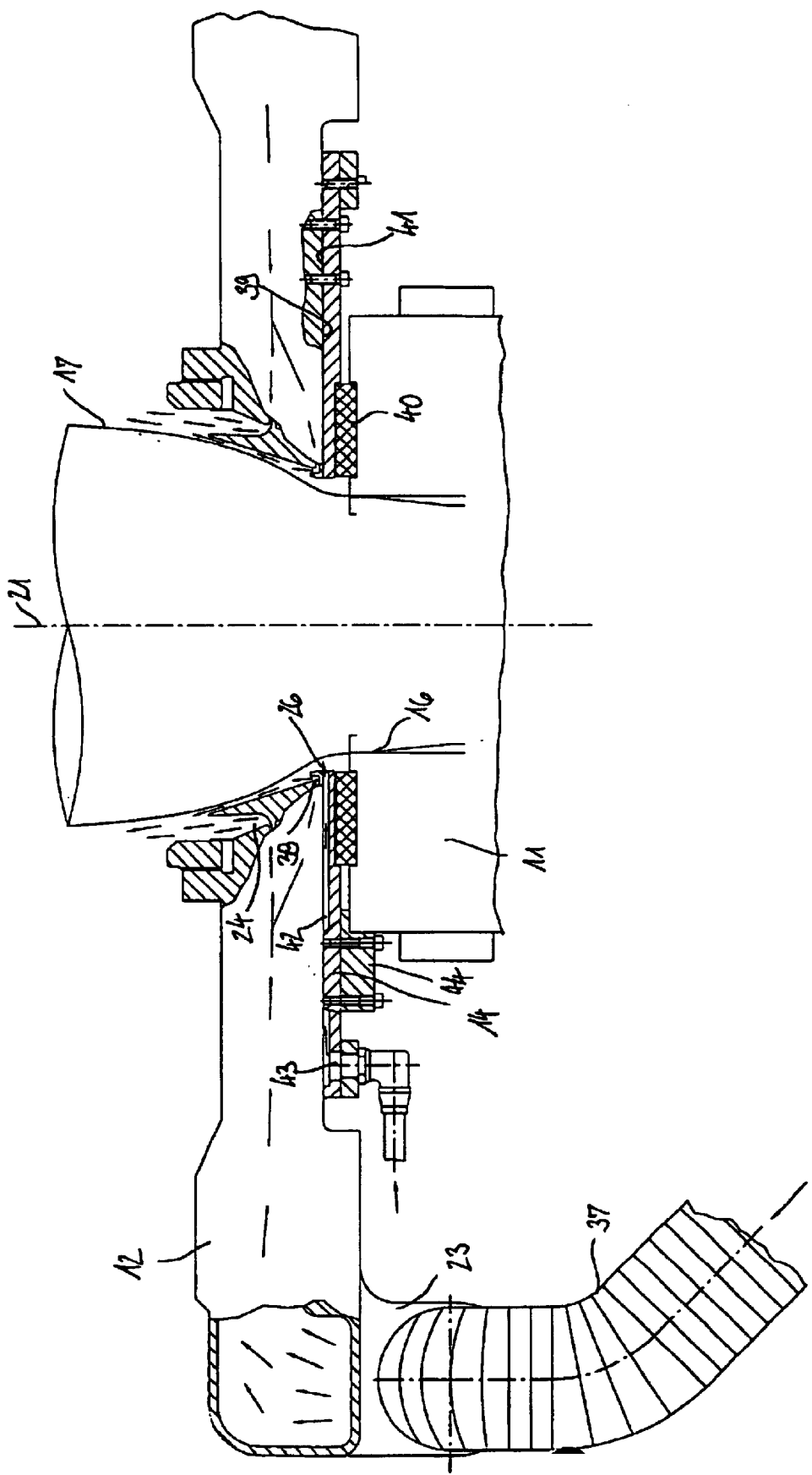
FIG. 5 is an enlarged partial section view through the blow head, the main cooling ring and the additional cooling ring.

FIG. 5, similar to FIG. 4, shows the annular nozzle 16 and the cooling rings 12, 14 in enlarged partial sections. Identical details have been given identical reference numbers, with different design characteristics being pointed out. One of the supply muffs 23 is followed by a supply line 37. It can be seen that the main cooling ring 12 is a hollow element. In addition to a first nozzle exit ring 24, the ring 12 includes a further nozzle exit ring 38. The main cooling ring 12 includes a lower planar face 39. The additional cooling ring 14 is bolted, at least in its inner region, to the ring 12.

The ring 14 has an upper substantially planar face 41. Individual radial grooves 42 are formed in the additional cooling ring 14. The grooves 42, on their radial outside, are connected to the individual attaching muffs 25, via through-holes 43. On the radial inside, the grooves 42 end in the additional nozzles 26. The radial grooves 42, together with the planar face 39, form the individual cooling gas channels.

The additional cooling ring 14 is centered relative to the blow head 11 by centering clips 44. This means that the main cooling ring 12 bolted to the additional cooling ring 14 is centered relative to the blow head and the annular nozzle 16 in the same way. An isolating disc 40 is positioned in the region of the individual nozzles 26 between the blow head 11 and the additional cooling ring 14.

Figure 6:
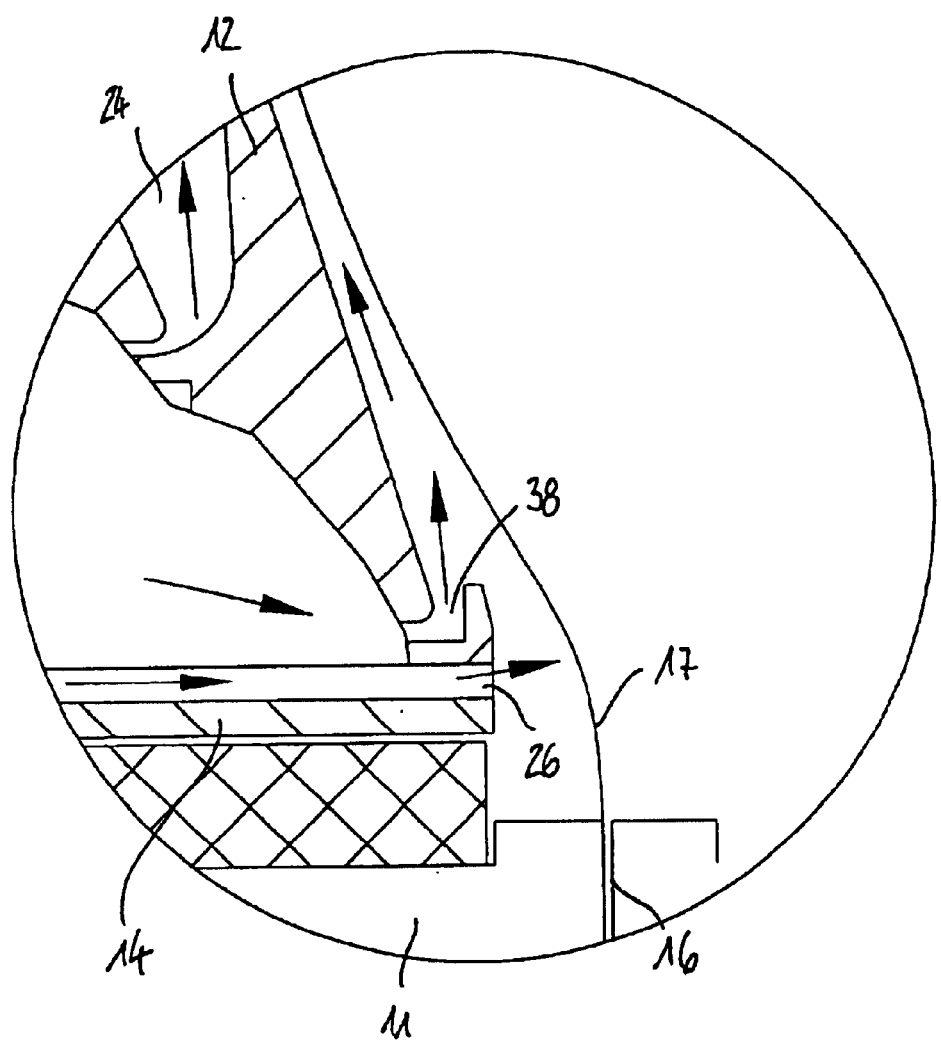
FIG. 6 is an enlarged section view of the nozzle exits at the additional cooling ring according to FIG. 5.

FIG. 6 is an enlarged drawing of a detail similar to FIG. 5. The blow head 11 has the nozzle slot 16 with the film tube 17 emerging from the slot 16. The film tube 17 is simplified in that it is shown with a uniform wall thickness. The isolating disc 40 is on the blow head 11. The main cooling ring 12 is above the disc 40. Thus, annular nozzles 24, 38 and the additional cooling ring 14 bolted on ring 12 with individual nozzle 26 are located above disc 40.

Figure 7:
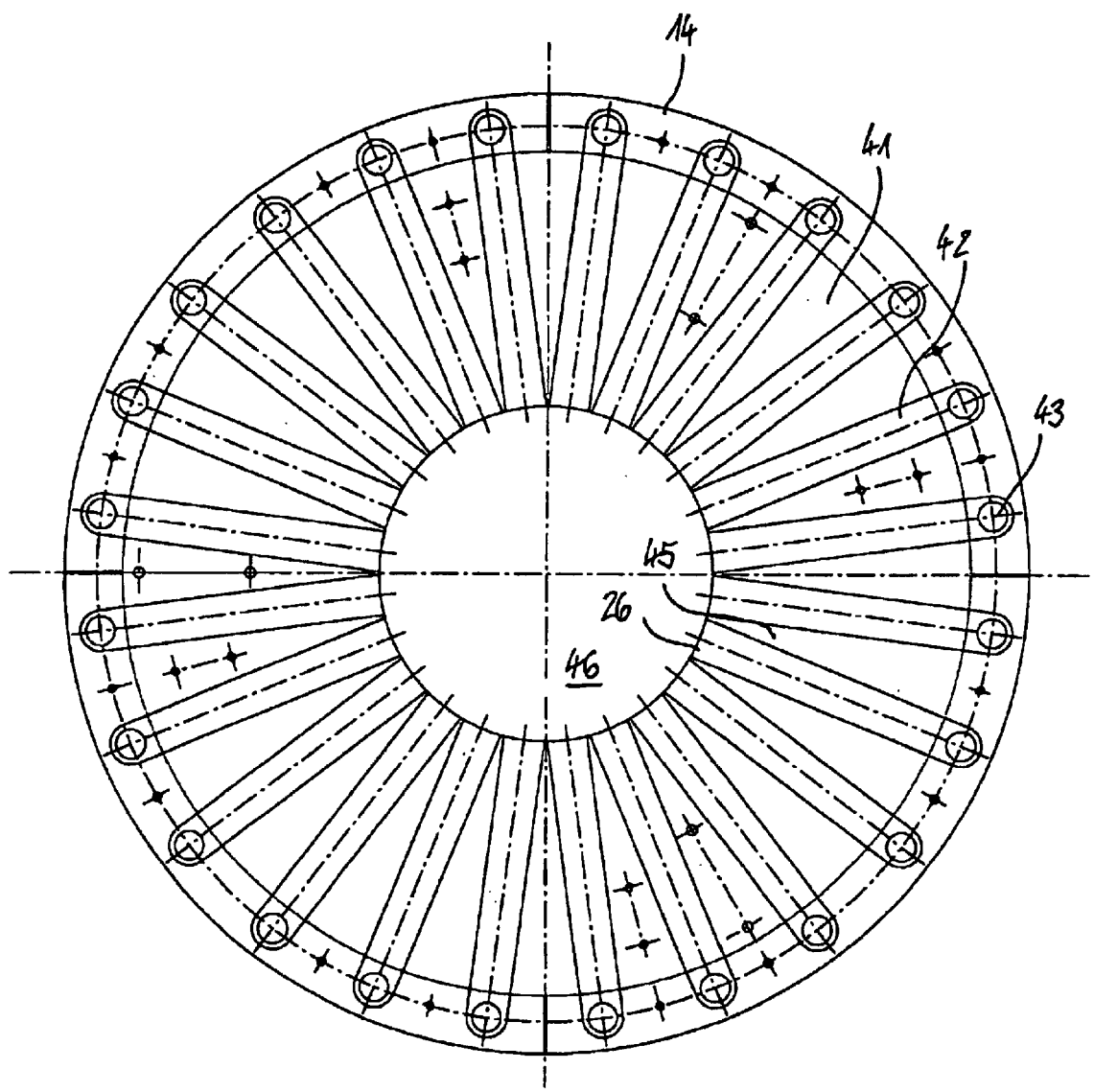
FIG. 7 is a plan view of a disc element of the additional cooling ring according to FIG. 5.

FIG. 7 is a plan view of the additional cooling ring 14 according to FIG. 5. Above-mentioned radial grooves 42 can be identified in substantially planar flange face 41. The grooves 42, on the outside, end at a distance from the circumferential edge. The grooves 42 are connected to the through-holes 43. The grooves 42, towards the inside, end in the nozzle openings 26. The grooves 42 are separated from one another by intermediate webs 45. The central through-aperture 46 for the film tube is in the center of the ring 14.

Figure 8:
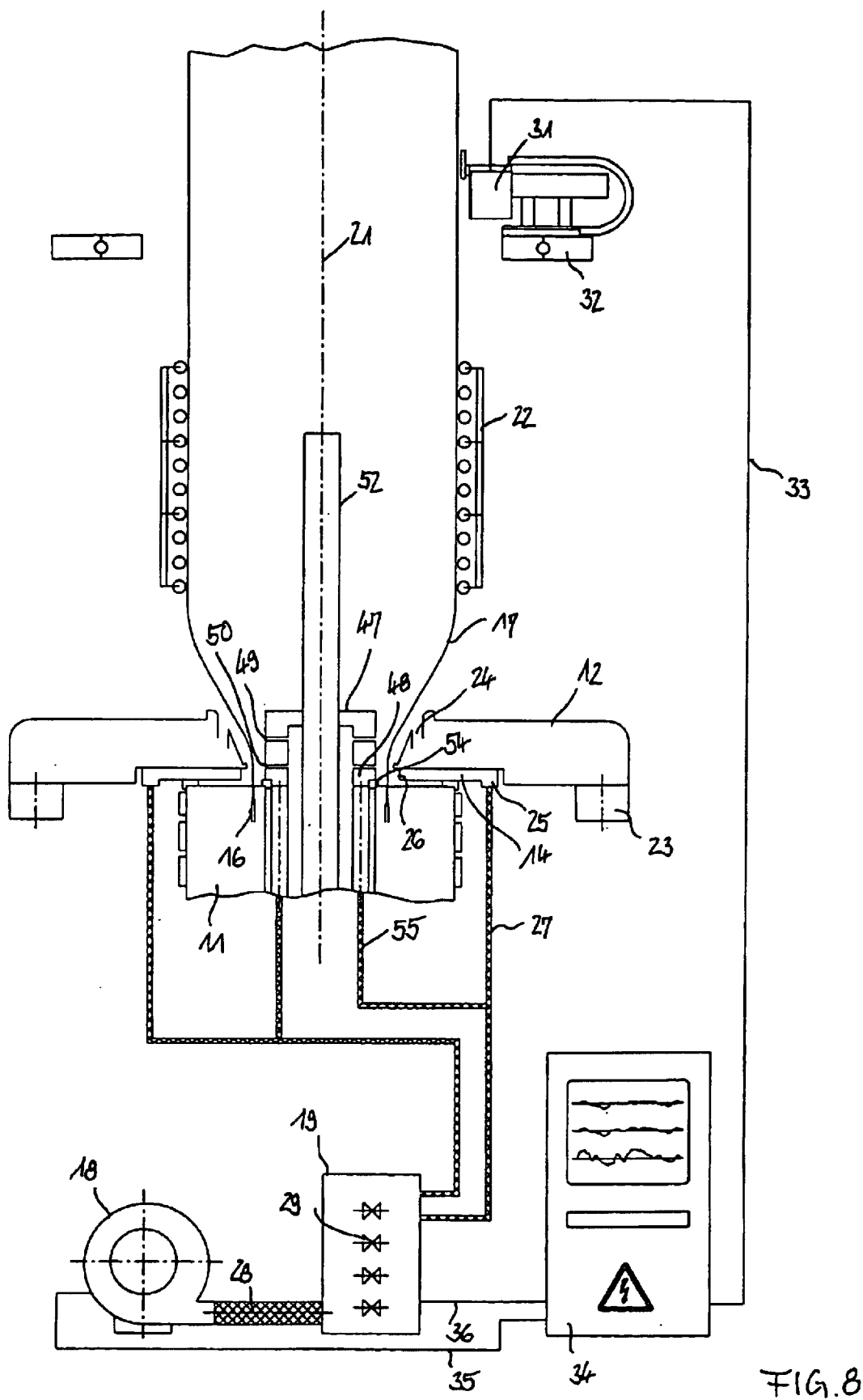
FIG. 8 is a schematic view of a third embodiment of the present invention.

FIG. 8 corresponds to FIG. 4 showing a device complemented by further details. Any details corresponding to FIG. 4 have been given the same reference numbers. Therefore, reference is made to the respective description of same.

An inner cooling device 47 is arranged inside the film tube 17. The inner cooling device 17 is bolted onto the blow head 11. The inner cooling device 47 comprises a plurality of elements to which reference will be made below in greater detail.

Annular nozzles 49, 50 are arranged at the circumference of the device 47 in different planes. The nozzles 49, 50 emerge radially outwardly and, via an inner hollow chamber 52, are supplied with cooling gas. The cooling gas is subsequently extracted by a co-axial central extraction pipe 52, whose upper end is open. A further additional cooling ring 48 is inserted between the inner cooling device 47 and the blow head 11. The cooling ring 48 generates a plurality of inner additional cooling gas streams 53 through individual nozzles 54. Nozzles 54 are supplied by individual supply lines 55 with additional controllable cooling gas. The lines 55 constitute branch lines of the individual lines 27. Thus, certain circumferential regions of the film tube 17 are subjected to uniformly controlled additional cooling gas on the inside and the outside.

Figure 9:
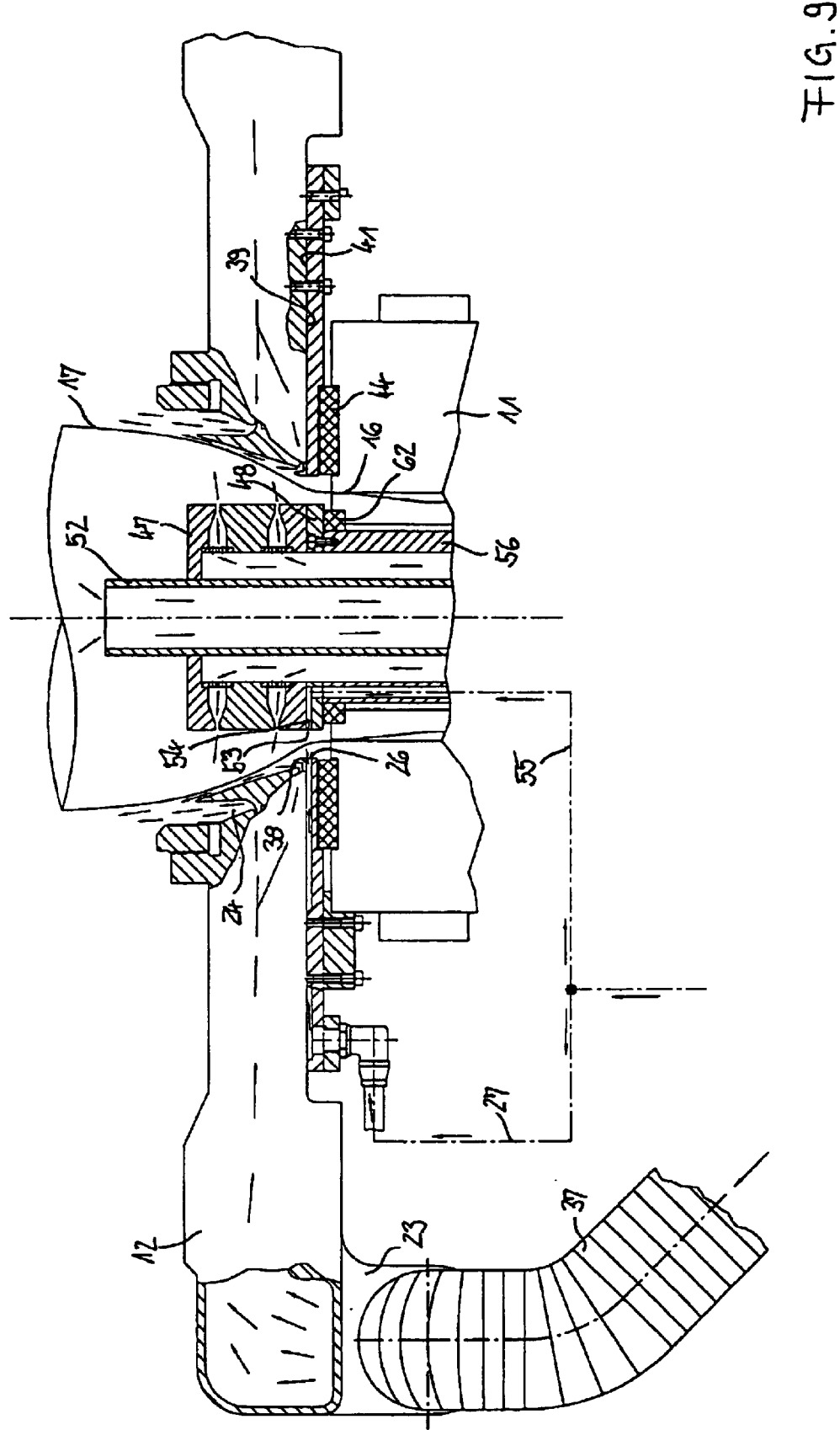
FIG. 9 is an enlarged partial section view of the blow head with the main cooling ring, the additional cooling ring and the inner cooling ring according to FIG. 8.

FIG. 9 shows the blow head 11, the main cooling ring 12 and the additional cooling ring 14 in the same way as in FIG. 5. Identical details have been given identical reference numbers; to that extent reference is made to the description of FIG. 5.

Inside the film tube 17 it is possible to identify the inner cooling device 47. The cooling device 47 is arranged on the blow head 11. The lowest element of the cooling device 47 is the inner additional cooling ring 48. The cooling ring 48 is bolted to a cylindrical pipe 56 inside the blow head 11. The supply lines 55 are provided inside pipe 56 in the form of bores. The additional cooling ring 48 includes through-bores 57. Bores 57 are connected to the supply lines 55. Radial grooves 59 are formed in a planar face 58 of cooling ring 48 and have ends forming the individual nozzles 54.

Furthermore, the inner cooling device 47 includes a plurality of disc elements. The disc elements are arranged one above the other. The lowermost disc element has a planar underside 60 which closes the radial grooves 59 towards the top. Thus, individual cooling gas channels are formed. The individual disc elements, together, form annular nozzles 49, 50. The disc elements are connected to one another by grid sleeves. A further isolating ring 62 is provided between the segment disc and the blow head 11.

Figure 10:
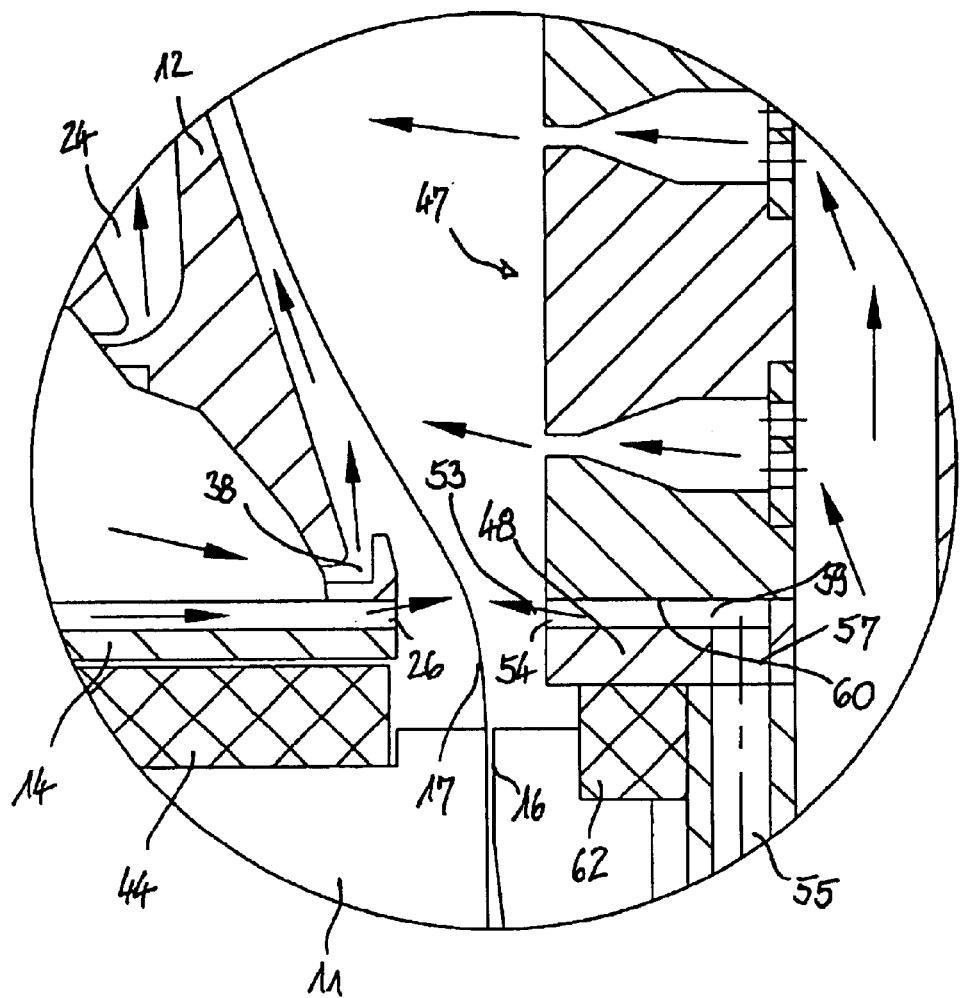
FIG. 10 is an enlarged section view of the exit nozzles of the additional cooling ring and of the inner cooling ring according to FIG. 9.

FIG. 10 shows the details already identifiable in FIG. 9 in a larger scale. In particular, the additional cooling gas exits nozzle 54 formed by the additional cooling ring 48 as well as the connection between the through-bores 57 and the supply channels 55 shown more clearly shown.

Figure 11:
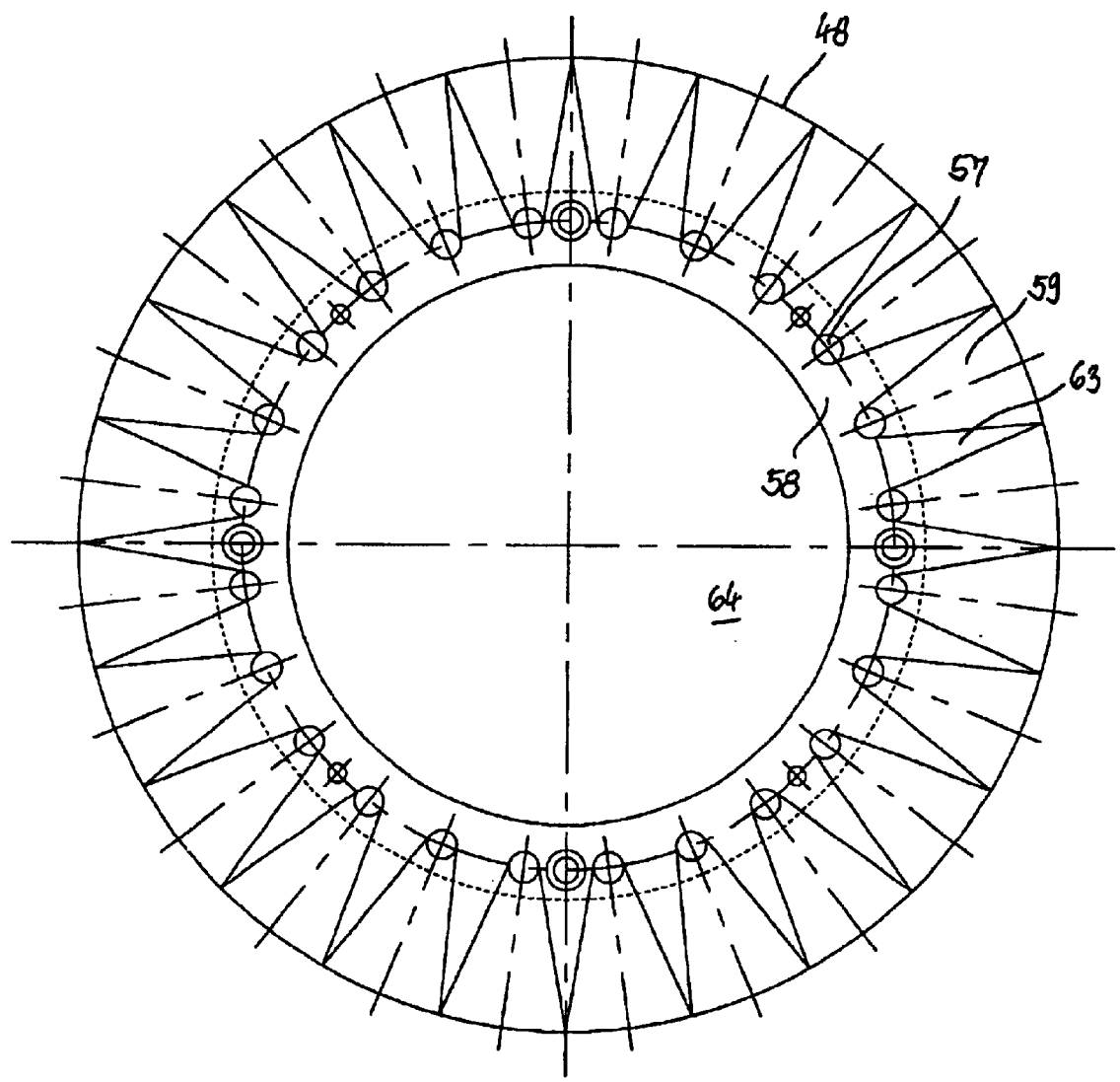
FIG. 11 is a plan view of a disc element of the inner cooling ring according to FIG. 8.

FIG. 11 shows the inner cooling ring 48 with the above-mentioned through-bores 57 and radial grooves 59. The grooves 59 are milled into a planar surface 58. The radial grooves 59 are separated from one another by separating webs 63 up to a point close to the outer circumference. The annular disc 48 includes a central aperture 64 for a general air supply.

While the above detailed description describes the preferred embodiment of the present invention, the invention is susceptible to modification, variation and alteration without deviating from the scope and fair meaning of the subjoined claims.

What is claimed is:

1. A device for controlling the thickness profile in the production of blown film, comprising a blown film extruder with a blow head for producing a film tube;

a main cooling ring for supplying a main cooling gas stream, said main cooling ring arranged above and in the direction of production behind the blow head;

said main cooling ring comprises annular nozzles which are arranged in two different planes, said nozzles fixed in section or which can be adjusted to a fixed section;

said nozzles being directed in the direction of production, the first of the nozzles having a smaller diameter than the second of said nozzles, with the first nozzle being arranged underneath and in the direction of production before the second nozzle;

an additional cooling ring arranged outside the main cooling ring, said additional cooling ring supplying separate additional cooling gas streams;

the additional cooling ring arranged adjacent the blow head of the blown film extruder underneath and in the direction of production before the main cooling ring;

at least one blower arranged outside the additional cooling ring and a number of volume flow rate control elements and supply lines corresponding to the number of additional cooling gas streams coupled between said at least one blower and said additional cooling ring;

a measuring and controlling device for controlling the thickness profile of the blown film, said measuring and controlling device measuring the film thickness at a film tube above and in the direction of production behind a freezing zone across the circumference, and individually controlling the additional cooling gas streams as a function of the measured film thicknesses, the additional cooling ring arranged adjacent the blow head of the blown film extruder underneath the main cooling ring.

2. A device according to claim 1, wherein the additional cooling ring comprises a one-piece segment disc with a substantially planar end face provided with cooling gas supply bores, said cooling gas supply bores are distributed around the outer circumference, radial grooves open at one end start from said bores and substantially extend as far as the inner circumference, said end face comprising the radial grooves sealingly resting against a substantially planar counter face of a cover part.

3. A device according to claim 2, wherein the cover part with the planar counter face is formed directly by the main cooling ring against which the segment disc is bolted.

4. A device according to claim 1, wherein a second additional cooling ring is arranged for supplying separate additional cooling gas streams inside the film tube and that outside said second additional cooling ring at least one blower is provided and a number of volume flow rate control elements and supply lines which corresponds to the number of said additional cooling gas streams are coupled between said blower and said second additional ring.

5. A device according to claim 4, wherein supply lines leading to the additional cooling ring on the outside and supply lines leading to the second additional cooling ring on the inside of the film tube for additional cooling streams in corresponding circumferential positions form branch lines of lines containing a joint volume flow rate control element for said branch lines.

6. A device according to claim 4, wherein the second additional cooling ring is arranged inside the film tube at the blow head of the blown film extruder in the plane of the additional cooling ring on the outside underneath the main cooling ring.

7. A device according to claim 4, wherein the additional cooling ring on the inside comprises a one-piece segment disc with a substantially planar end face, air supply bores distributed on the inner circumference, radial grooves being open at one end and substantially extending as far as the outer circumference, said end face with the radial grooves sealingly resting against a substantially planar counter face of a cover part.

8. A device according to claim 7, wherein the cover part with the planar counter face is formed by an inner cooling device with at least one annular nozzle which is arranged inside the film tube.

9. A device for controlling the thickness profile in the production of blown film, comprising a blown film extruder with a blow head for producing a film tube;

a main cooling ring for supplying a main cooling gas stream, said main cooling ring arranged above and in the direction of production behind the blow head;

said main cooling ring comprises annular nozzles which are arranged in two different planes, said nozzles fixed in section or which can be adjusted to a fixed section;

said nozzle being directed in the direction of production, the first of the nozzles having a smaller diameter than the second of said nozzles, with the first nozzle being arranged underneath and in the direction of production before the second nozzle;

said main cooling ring comprises annular nozzles which are arranged in two different planes, said nozzles fixed in section or which can be adjusted to a fixed section;

an additional cooling ring arranged outside the main cooling ring, said additional cooling ring supplying separate additional cooling gas streams;

the additional cooling ring arranged adjacent the blow head of the blown film extruder underneath and in the direction of production before the main cooling ring;

a measuring and controlling device for controlling the thickness profile of the blown film, said measuring and controlling device measuring the film thickness at a film tube above and in the direction of production behind a freezing zone across the circumference, and individually controlling the additional cooling gas streams as a function of the measured film thicknesses, the additional cooling ring arranged adjacent the blow head of the blown film extruder underneath the main cooling ring;

at least one blower arranged outside the additional cooling ring and a number of volume flow rate control elements and supply lines corresponding to the number of additional cooling gas streams coupled between said at least one blower and said additional cooling ring; and second additional cooling ring is arranged for supplying separate additional cooling gas streams inside the film tube and that outside said second additional cooling ring at least one blower is provided and a number of volume flow rate control elements and supply lines which corresponds to the number of said additional cooling gas streams are coupled between said blower and said second additional ring.

* * * * *